US010240688B2

(12) United States Patent
Besse et al.

(10) Patent No.: US 10,240,688 B2
(45) Date of Patent: Mar. 26, 2019

(54) DEVICE HAVING A PLURALITY OF LATCHING MICRO-ACTUATORS AND METHOD OF OPERATING THE SAME

(71) Applicant: ECOLE POLYTECHNIQUE FEDERALE DE LAUSANNE (EPFL), Lausanne (CH)

(72) Inventors: Nadine Besse, Neuchâtel (CH); Juan José Zarate, Neuchâtel (CH); Samuel Rosset, Chaumont (CH); Herbert Shea, Cormondrèche (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 34 days.

(21) Appl. No.: 15/635,225

(22) Filed: Jun. 28, 2017

(65) Prior Publication Data
US 2018/0003319 A1    Jan. 4, 2018

Related U.S. Application Data

(60) Provisional application No. 62/355,955, filed on Jun. 29, 2016.

(51) Int. Cl.
F16K 31/02 (2006.01)
F16K 99/00 (2006.01)
F03G 7/06 (2006.01)

(52) U.S. Cl.
CPC ......... *F16K 99/0038* (2013.01); *F03G 7/065* (2013.01); *F16K 99/0015* (2013.01); *F16K 2099/0084* (2013.01)

(58) Field of Classification Search
CPC ... F16K 99/0038; F16K 99/0015; F03G 7/065
USPC ....... 137/828, 827, 814, 815, 487.5, 505.36, 137/565.16, 601.13
See application file for complete search history.

(56) References Cited

U.S. PATENT DOCUMENTS

| 5,325,880 | A | * | 7/1994 | Johnson | F15C 3/04 137/1 |
| 7,550,189 | B1 | * | 6/2009 | McKnight | B32B 3/10 148/563 |
| 8,237,324 | B2 | | 8/2012 | Pei et al. | |
| 8,482,392 | B2 | | 7/2013 | Rousseau | |
| 8,551,599 | B2 | * | 10/2013 | Hua | B01L 3/502707 137/67 |
| 8,973,613 | B2 | * | 3/2015 | Murphy | F15B 21/065 137/827 |
| 9,797,524 | B2 | * | 10/2017 | Hui | F16K 99/0001 |

(Continued)

OTHER PUBLICATIONS

Xiaofan Niu, Dielectric Actuation of Polymers, UCLA Thesis, 2013.

(Continued)

*Primary Examiner* — Minh Le
(74) *Attorney, Agent, or Firm* — Andre Roland S.A.; Nikolaus Schibli

(57) ABSTRACT

An actuator device including a plurality of transducer actuators, and a common pneumatic actuation mechanism for shaping the plurality of transducer actuators, wherein each actuator of the plurality of transducer actuators includes a shape memory polymer membrane, an integrated stretchable heater, and a pressure interface to the common pneumatic actuation mechanism.

12 Claims, 9 Drawing Sheets

(56) References Cited

U.S. PATENT DOCUMENTS

| | | | |
|---|---|---|---|
| 9,898,903 B2* | 2/2018 | Khoshkava | G08B 6/00 |
| 2007/0166199 A1* | 7/2007 | Zhou | B01L 3/5025 |
| | | | 422/400 |
| 2007/0204926 A1* | 9/2007 | Beerling | B01L 3/5027 |
| | | | 137/828 |
| 2008/0173833 A1* | 7/2008 | Vyawahare | F16K 99/0001 |
| | | | 251/11 |
| 2009/0047197 A1* | 2/2009 | Browne | F16D 28/00 |
| | | | 422/307 |
| 2009/0314368 A1* | 12/2009 | McAvoy | B01L 3/50273 |
| | | | 137/828 |
| 2010/0093559 A1* | 4/2010 | Fan | B01L 3/502738 |
| | | | 506/9 |
| 2010/0162109 A1 | 6/2010 | Chatterjee et al. | |
| 2010/0229610 A1* | 9/2010 | Garrigan | E05B 47/0009 |
| | | | 70/174 |
| 2010/0234779 A1 | 9/2010 | Asvadi et al. | |
| 2010/0295820 A1 | 11/2010 | Kikin-Gil | |
| 2012/0105333 A1* | 5/2012 | Maschmeyer | G06F 3/016 |
| | | | 345/173 |
| 2012/0128549 A1* | 5/2012 | Zhou | B01L 3/5025 |
| | | | 422/504 |
| 2013/0269176 A1* | 10/2013 | Ishida | H01H 11/00 |
| | | | 29/622 |
| 2014/0079571 A1* | 3/2014 | Hui | F04B 19/006 |
| | | | 417/392 |
| 2014/0157769 A1* | 6/2014 | Daly | F03G 7/065 |
| | | | 60/527 |
| 2015/0240958 A1* | 8/2015 | Mosadegh | B25J 9/148 |
| | | | 137/12 |
| 2015/0247580 A1* | 9/2015 | Au | B01L 3/502707 |
| | | | 137/613 |
| 2017/0194553 A1* | 7/2017 | Ifju | F03G 7/065 |
| 2018/0066636 A1* | 3/2018 | Khoshkava | F03G 7/065 |

OTHER PUBLICATIONS

Xu, Hangxun, et al. "Deformable, programmable, and shape-memorizing micro-optics." Advanced Functional Materials 23.26 (2013): 3299-3306.

* cited by examiner 1 cm 1 cm 1 cm 1 cm

DEVICE HAVING A PLURALITY OF LATCHING MICRO-ACTUATORS AND METHOD OF OPERATING THE SAME

CROSS-REFERENCE TO RELATED APPLICATIONS

The present invention claims priority to the U.S. provisional patent application with the Ser. No. 62/355,955 that was filed on Jun. 29, 2016, the entire contents thereof being herewith incorporated by reference.

FIELD OF THE INVENTION

The present invention is directed to the field of multistable actuators, more particularly to the field of a plurality of shape-memory polymer material actuators, and shape-memory polymer membrane based micro-actuators, arranged in an array.

BACKGROUND

Arrays of independent pneumatic actuators are usually bulky and complex. Indeed, either a complex system of valves (at least 2N for an N×N array) is necessary to define the air or liquid path through the system or each transducer has a dedicated pump driving it. Soft materials like silicones are commonly used, since they are easily deformable, which allows to obtain large amplitude of displacement. However, the pressure supply needs to be continuously turned on to hold the actuator in the "on" position; meaning that it is power consuming.

Large array of densely-packed micro-actuators are notably present in Braille, haptics, displays, adaptive optics, fiber switches and tunable antennas. In these applications, the actuators size ranges from 1 μm to 10 mm in the Cartesian x-y-z directions, with hundreds to millions actuators per complete device. In order to control the actuators individually, a simple addressing scheme, ideally compatible with standard electronics, is required. Furthermore, there is a need for an overall low power consumption; a requirement that can be fulfill either by implementing a latching system within the transducer or by using an ultra-low power technology for switching each actuator. Finally, the manufacturing process has to be simple, compact and reliable to design a robust large array of micro-actuators.

Therefore, in the field of arrays of actuators, substantially improved solutions are required to reduce power consumption and losses, improve density of the actuators, reduce complexity, and make the arrays portable, for various applications.

SUMMARY

According to one aspect of the present invention, an actuator device is provided, preferably including a plurality of transducer actuators and a common pneumatic actuation mechanism for shaping the plurality of transducer actuators. Moreover, preferably, each actuator of the plurality of transducer actuators includes a shape memory polymer membrane, an integrated stretchable heater, and a pressure interface to the common pneumatic actuation mechanism.

According to another aspect of the present invention, a method for operating an actuator device is provided. Preferably, the actuator device includes a plurality of transducer actuators, and a common pneumatic actuation mechanism, each transducer actuator including a shape memory polymer membrane, an integrated stretchable heater, and a pressure interface to the common pneumatic actuation mechanism. Moreover, the method preferably includes the step of selectively heating some of the transducer actuators of the plurality of transducer actuators by the corresponding integrated stretchable heater, and providing a common fluid pressure to all of the transducer actuators for moving the transducer actuators that are heated by the step of selectively heating.

The above and other objects, features and advantages of the present invention and the manner of realizing them will become more apparent, and the invention itself will best be understood from a study of the following description with reference to the attached drawings showing some preferred embodiments of the invention.

BRIEF DESCRIPTION OF THE SEVERAL VIEWS OF THE DRAWINGS

The accompanying drawings, which are incorporated herein and constitute part of this specification, illustrate the presently preferred embodiments of the invention, and together with the general description given above and the detailed description given below, serve to explain features of the invention.

Herein, identical reference numerals are used, where possible, to designate identical elements that are common to the figures. Also, the images are simplified for illustration purposes and may not be depicted to scale.

DETAILED DESCRIPTION OF THE PREFERRED EMBODIMENTS

Figure 1A:
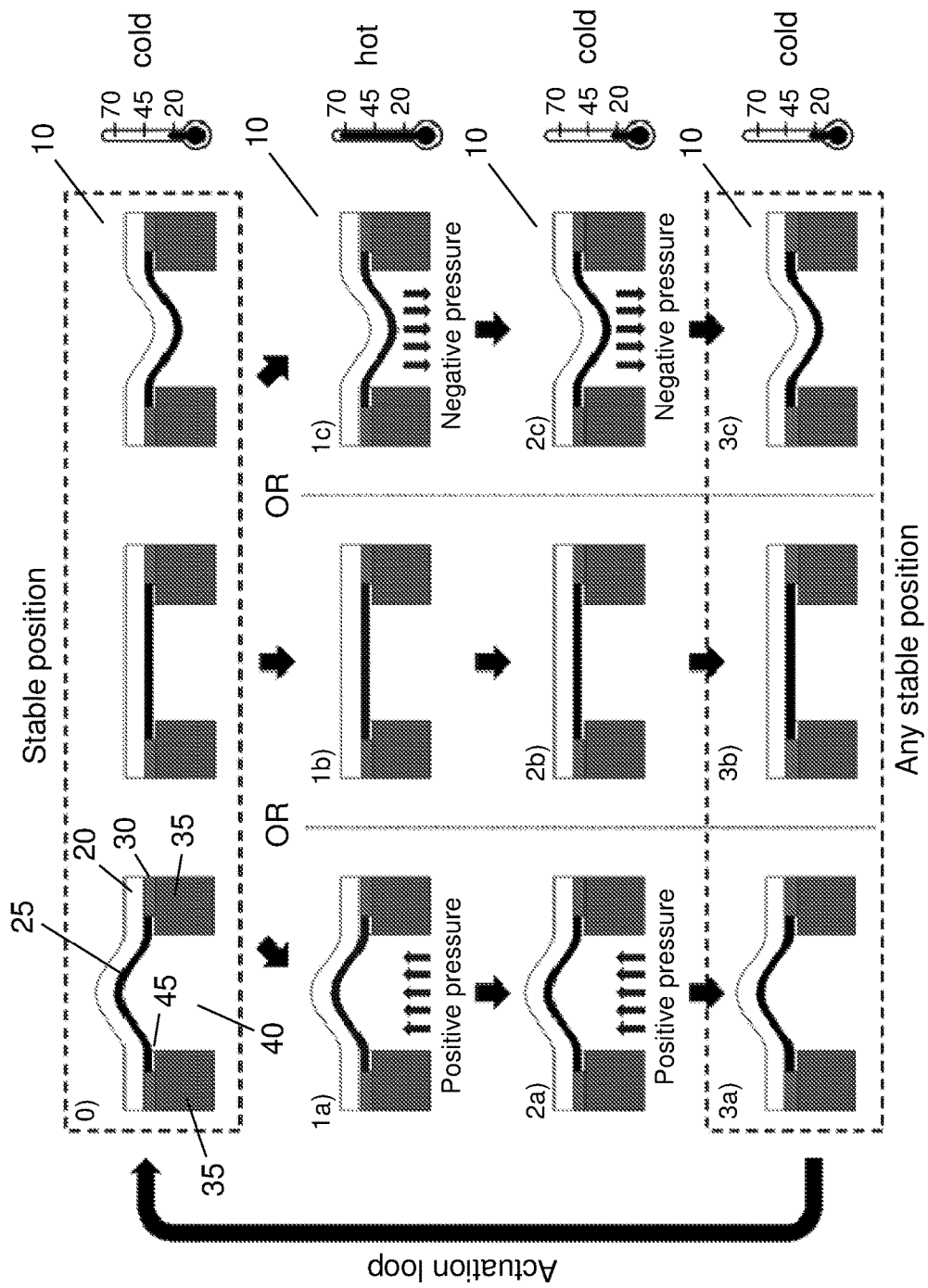
FIG. 1 schematically shows a side view of different states working principle of a single shape memory polymer (SMP) having actuators showing all the different states possible during an actuation cycle.

According to one aspect of the present invention, a simple method and device is presented to efficiently control and operate an array, matrix or other type of arrangement of a plurality of multistable actuators is presented. The device can be used as a dense and flexible array or matrix of independently controlled actuators, but also as a single actuator, or a small number of independently controllable actuators. The arrangement is not limited to an array, other types of arrangements, whether ordered or not ordered, are also possible.

The device can include a plurality of transducer actuators, for example an array of actuators that includes a shape memory polymer membrane, a plurality of integrated compliant stretchable heaters, one per actuator, and an interface to a single common pneumatic actuation mechanism. Passing current through the individually addressable local heating elements reversibly and rapidly changes the stiffness of the shape memory polymer of each actuator. The common pneumatic actuation mechanism allows displacing only the actuators that have been heated, leaving un-displaced the unheated elements. The device and method for using the same allows for large actuation force, yet very simple and compact system design with hundreds or thousands of independently controlled actuators in a very dense array. By turning off the heating current, each actuator can be latched into its current position, enable holding any array configuration with zero power consumption.

According to one aspect, the present device and method can be used in several applications: notably tactile tablets, haptics displays, reconfigurable antennas/mirrors, microfluidics for providing actuators for microfluidic valves and flow restrictors, soft robotics and camouflage. Examples of SMPs for vehicles, see reference [2], for consumer electronics, see reference [3, 4], for cosmetics, see reference [5], and for optics, see reference [6] have been described in the background art. However, none of them specifically mention the use of compliant and integrated heaters to locally, quickly, reversibly, and efficiently deform the device surface.

There are several limitations with respect to the existing solutions for large arrays or another type of arrangement of a large number of latching micro-actuators, and conventional arrays of pneumatic actuators.

For example, dielectric Elastomer Actuators (DEAs) are transducers based on soft elastomers that can often exceed 100% actuation strain. High voltages, usually more than 1 kV, are required to achieve large displacements and due to the soft nature of elastomers, only small forces can be generated. This is one of the main drawbacks of this technology. Moreover, high voltage switches are bulky and expensive. Hence, it limits the potential for developing large arrays of DEA actuators with an individual control and driving of each actuator.

At the University of California, Los Angeles ("UCLA"), DEA have been used to make a Braille display, see reference [7], by using a shape memory polymer as the dielectric layer. High forces, relatively large displacements and intrinsic latching have been obtained. Each actuator was actuated independently by switching on and off a dedicated high voltage line, while the entire device is heated in an oven. Hence, due to the bulky high voltage switches and the lack of integrated heating mechanism, meaning a very slow refresh rate and the need for an oven, this device is cannot be made portable and it fails to provide adequate performance for many applications.

Electromagnetic micro-actuators are generally composed of a coil and of a permanent magnet. The main advantage of this approach is that relatively large actuation strokes can be achieved without any direct contact between the magnet and the coil. Hence, the driving electronics can be completely separated from the moving part, which significantly simplifies the manufacturing process. However, compared to piezoelectric or pneumatic actuators, the force generated is relatively weak and the power consumption is quite significant, except if an external latching mechanism is implemented. Moreover, it is difficult to fabricate a compact array, because the magnets tend to interact strongly with each other. Such devices have been demonstrated for a wide range of applications, including lab-on-chip valves arrays, micromirrors arrays and tactile displays. For tactile displays, the actuator 10 can be configured as a tactile pixel, also called taxel, and an array or matrix of taxels can be made to implement the tactile display.

As illustrated in FIG. 1, schematically shown a side cross-sectional view of an individual actuator 10, each actuator 10 starts in the flat state, as fabricated, as shown in the representations of the central column, and can then be deformed into a multitude of temporary inflated or deflated stable shapes, depending on the pressure applied during the actuation cycle. The individual actuators 10 are shown to include a SMP membrane 20, an integrated stretchable heater 25 that is in close contact or bonded to the lower surface of the SMP membrane 20, an insulating adhesive layer 30 to attach the SMP membrane 20 and heater 25 to a frame 35, in the variant shown adhesive layer made 30 of a transparent or clear adhesive.

Frame 35 is made of a flexible or rigid printed circuit board (PCB), the SMP membrane 20 and the heater 25 supported by the frame 35 with a pressure interface 40, in the variant shown a through hole, opening, or bore through frame 35. A lower surface of heater 25 and a partial upper surface of frame 35 are bonded to each other with a conductive adhesive 45, for example a silver epoxy layer. Pressure interface 40 of each actuator 10 can be fed with positive or negative pressure, for example air pressure of gas pressure from a pump via a pneumatic chamber, shown in FIG. 2A. Pressure interface 40 and frame 35, insulating adhesive layer 30 and conductive adhesive 45 are made to be airtight.

Each one of the heaters 25 of the actuator 10 can be fed with power to heat the SMP membrane 20, for example by feeding a current to heater 25 that is made of an electrode having a certain ohmic resistance, or by radiation. In a variant, it is also possible that the SMP membrane 20 and the heater 25 are formed by the same element, with the SMP membrane 20 made to have a certain ohmic resistance and with electrical terminals to provide for electrical power. For example, it can be possible to provide for conductive and non-conductive regions in membrane, the conductive regions defining a heater 25. This could be done by locally functionalizing or implanting specific nanoparticles by local photonic sintering. Heating is needed only to switch between stable positions and only the actuators that need to be reconfigured are heated. Heating an actuator without applying any pressure brings it back to its initial "memory" flat state. In other words, the shape memory polymer membrane is maintained in a flat state by a memory function of the shape memory polymer membrane, while external pressure is provided via pressure interface 40. Notice that to lock the temporary shape, the external pressure has to be kept for a longer time period than the heating. The device can be mounted on a rigid support, but also incorporated on a flexible frame, allowing for wearable and bendable applications.

The device having a matrix or an array of latching SMP micro-actuators is highly versatile. In the mechanical domain, it can exert high forces, needed for instance for compliant haptic interfaces, arrays of microfluidic valves, or soft robotic grippers. The deformable surface also controls how electromagnetic waves are reflected, leading to applications in camouflage, adaptive optics, and reconfigurable radio-frequency (RF) or millimeter-wave surfaces.

Regarding the applications for the array of latching SMP micro-actuators, it is possible to implement haptic displays and tactile screens or tables. SMPs are particularly attractive for haptic displays, for example to develop screens with arbitrary topology, and tactile tablets or display, for example to render Braille or graphical information to blind and visually impaired people, because the present device and method combines latching with large displacement and high holding force. Considering the shape memory effect SMPs and taking advantage of their drastic change in Young's modulus with temperature, both actuation and latching can be achieved using a single thin membrane layer. Indeed, these features enable the following features:

When cold, have a rigid membrane that can sustain a significant holding force when operating at room temperature, in the glassy state;

When hot, have a soft membrane that requires only a small external force to be displaced when heated above the glass transition temperature, in the rubbery state;

Set a temporary shape, the upward or the downward position, by synchronizing the heating and the actuation step;

The device only consumes power only during the transition from the upward to the downward position and inversely, while keeping indefinitely the last temporary shape otherwise.

In order to reduce the manufacturing complexity and costs, a single and common pressure controller was embedded in the device while having a heater integrated on each actuator. The heater locally provides the required stimulus by Joule heating and thereby enables selectivity. The membrane is circular to avoid stress concentration and rigidly clamped to a pressurizable chamber. Upon synchronization of pneumatic actuation and Joule heating in the integrated heater, out-of-plane motion of the membrane is obtained.

Figure 2A:
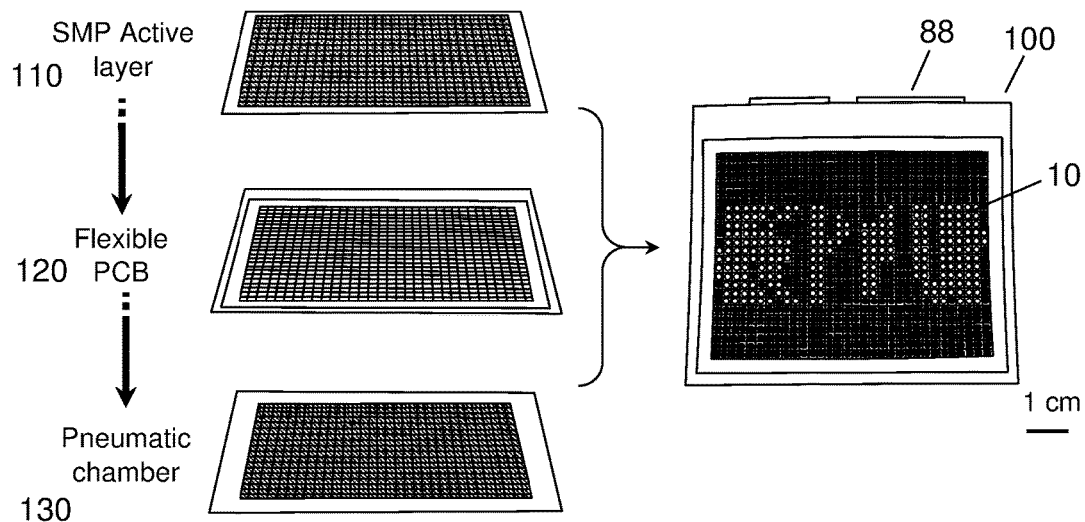
FIGS. 2A and 2B schematically shows perspective view of a possible embodiment showing an SMP array or matrix 100 having N×M actuators 10, with the integration of SMP layer with flexible PCB and thin pneumatic chamber to realize a flexible haptic display, with FIG. 2B specifically showing a common pneumatic system including a pump and a power controller for controlling the individual heater elements for each actuator 10.
Figure 2B:
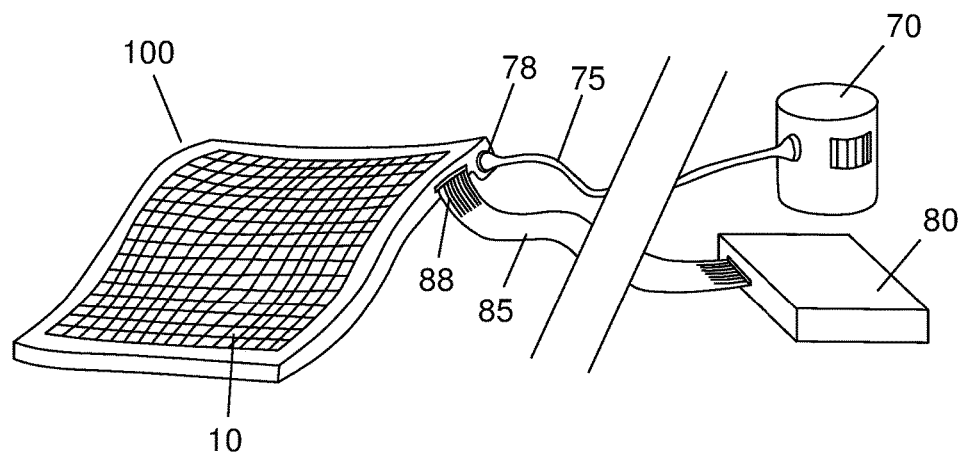

FIGS. 2A and 2B show a perspective schematic view of a possible embodiment showing a flexible SMP array 100 of actuators 10, and the common pneumatic chamber, the array 100 including an SMP active layer 110 having an array of SMP membranes 20 and heaters 25, a flexible PCB layer 120 forming the frame 35 and the individual pressure interfaces 45 for each SMP membrane 20, and a thin common pneumatic chamber 130 that can commonly feed a pressurized fluid, preferably air, to each one of the pressure interfaces 45. FIG. 2B specifically shows a common pneumatic system including a pump and a power controller for controlling the individual heater elements for each actuator 10, as an example, a flexible SMP array 100 is shown including the matrix of individual actuators 10 operatively connected to a pump 70 to provide for positive, negative, or no pressure via a duct 75 to a common inlet 78 of the flexible SMP array 100. The fluid pressure can be provided via pneumatic chamber 120 to the pressure interface 40 of each actuator 10, see for example in the cross-sectional view of FIG. 3B. Moreover, a power controller device 80 is shown, that is configured to selectively control the heating and cooling of each integrated stretchable heater 25 for each actuator 10 individually. This can be done via a connection cable 85 that is connected to a port 88. Power controller device can selectively address each integrated stretchable heater 25 to selectively heat each SMP membrane 20 of actuator 10, with a matrix of electrical column and row low lines in flexible PCB layer 120 to address each heater 25 individually.

For the present device and method, according to one aspect, it is proposed to use Shape Memory Polymer (SMP). SMPs are phase change materials that present the ability to memorize a permanent shape, to be deformed and fixed to a temporary shape under specific conditions of temperature and stress, and then later to relax to their original permanent shape upon thermal command. This relaxation is associated with the storage of elastic energy during the actuation cycle. During this thermal cycle, the Young's modulus for SMPs typically drops from $Y_L$=0.1–10 GPa in the glassy state, below the glass transition, to $Y_H$=0.1–10 MPa in the rubbery state, above the glass transition.

One of the advantage of the present device and method that uses an array of SMPs is the use of a single and common pneumatic actuation system coupled with the integration of one compliant and stretchable heater per transducer. With the present device and method, an integrated local Joule heater can be used per actuator which rapidly modifies the membrane stiffness; the actuator can thus be reshaped upon external pneumatic actuation. Moreover, pneumatic actuation is used via air pressure which is preferred as compared to fluidic, magnetic, piezoelectric, and electrostatic actuation. Indeed, we do not need to additionally tailor its dielectric constant, dielectric strength, permeability, or piezoelectric constant to obtain large motion.

With the present device and method, according to another aspect, a large arrays of latching polymer actuators can be controlled. Each actuator includes a shape memory polymer membrane, an integrated compliant stretchable heater, and an interface to a single pneumatic common actuation mechanism. Passing current through the individually addressable local heating elements reversibly and rapidly changes the stiffness of the shape memory polymer of selected actuators. The common pneumatic actuation mechanism allows displacing only the actuators that have been heated, leaving un-displaced the unheated elements. Having a pressure source, shared by all the actuators, allows to create a large actuation force whilst using a very simple and compact system design. By turning off the heating current, each actuator can be latched into its current position, enable holding any array configuration with zero power consumption.

By synchronizing the heating and cooling process with a single and common pressure source embedded in the device, it is possible to fully reconfigure the device with any actuator placed and locked in the "up", "down" or any intermediate position.

According to another aspect, the present device is compact and is also compatible with standard electronics, for example less than 30 V are typically necessary for heating, and its very low manufacturing complexity compared to any of the existing solutions. By controlling the motion via local heating, there is no need for thousands of bulky actuation mechanisms and drivers. Moreover, by implementing a local integrated heating and not a global one, a relatively fast refresh rate can be obtained, in the order 10 Hz. Finally, thanks to the intrinsic multi-stable nature of SMPs, power is needed only during actuation.

Compared to a standard large-scale pneumatic system, SMP array of actuators with local heating elements do not require thousands of valves or pumps. A single pump is sufficient to actuate the device and it needs to be turned on only while transitioning from one state to the other. Only the heated actuators will move due to the drastic change in Young's modulus between the hot and cold state in SMPs, i.e. more than a factor 100.

Moreover, compared to devices using the DEA, a single high voltage switch is necessary to drive a complete SMP array of actuators with local heating elements. A SMP in its cold state is roughly one order of magnitude stiffer than a DEA, while it is of similar order of magnitude in its hot state. For example, 0.1 GPa to 10 GPa for a SMP in its cold state compared to 0.1 MPa to 10 MPa for a common DEA or a SMP in its hot state. Hence, only the heated actuators will be able to squeeze and expand in-plane when a high voltage is applied between both compliant electrodes.

Moreover, compared to devices using piezoelectric actuators, similar forces/displacements can be achieved with more dense arrays of SMP actuators with local heating elements. Actually, two-dimensional (2D) arrays of SMP actuators can be produced and not only one-dimensional (1D) arrays alike with piezoelectric ones. Indeed, on the one hand, a SMP in its hot state behaves like an elastomer, meaning that it can be elongated by several percent and thus it can be miniaturized while still reaching the same overall displacement than a piezoelectric material. On the other hand, in its cold state, a SMP is quite stiff, which implies that it can hold high forces as well.

Compared to devices using electromagnetic actuators, SMP array of actuators with local heating elements enables to achieve a higher force/displacement tradeoff, to reduce significantly the power consumption thanks to the intrinsic latching property of SMPs and to simplify the manufacturing process by having a fully integrated fabrication process. The proposed device or method has a relatively slow heating/cooling process, usually around a few seconds, as compared to the switching rate reachable by the direct control of electrostatic, piezoelectric or electromagnetic actuators, which can be as low as a few microseconds. But none of these approaches are implementing an intrinsic latching.

According to one aspect of the present device and method, it is possible to fully reshape large arrays of densely packed SMP micro-actuators and to synchronize local Joule heating with a single pressure supply, enabling individual control of all actuators using low voltage signals. Local heating spot are placed on the SMP membrane in order to precisely define regions where the stiffness can be varied by several order of magnitude. Depending on the state of each spot, cold or hot, its local stiffness will vary from $Y_L$=0.1–10 GPa in its cold state, being the glassy state, below the glass transition, to $Y_H$=0.1–10 MPa in its hot state, being the rubbery state, above the glass transition. By a timely synchronization of the thermal stimuli and the external pressure, each actuator can be independently, reversibly and rapidly latched into several positions. By synchronizing the global pneumatic source and local heating, selective, latching, and reversible actuator out-of-plane motion is achieved.

According to one aspect of the present invention, some of the advantages of the present device and method is the integration of a local heater to each actuator and the use of a pneumatic actuation instead of dielectric electrostatic one. Indeed, local and selective heating to each actuator considerably reduces the size of the device, as high voltage switches are bulky and expensive, and speeds up the refresh rate, Joule heating is a slow process, especially when it is global. Furthermore, pneumatic actuation gives more flexibility in term of design, in terms of the materials and the dimensions used, while providing more force and thus more out-of-plane displacement. In addition, the active layer of the device, including an SMP membrane and integrated stretchable heaters presents the advantages of being thin and flexible, meaning that the device, when implemented as a haptic display, can be bent around curved objects. Combining flexibility, wearability and reshapability as shown in FIGS. 3A to 3F of a large array of actuators is novel and unique.

Figure 3A:
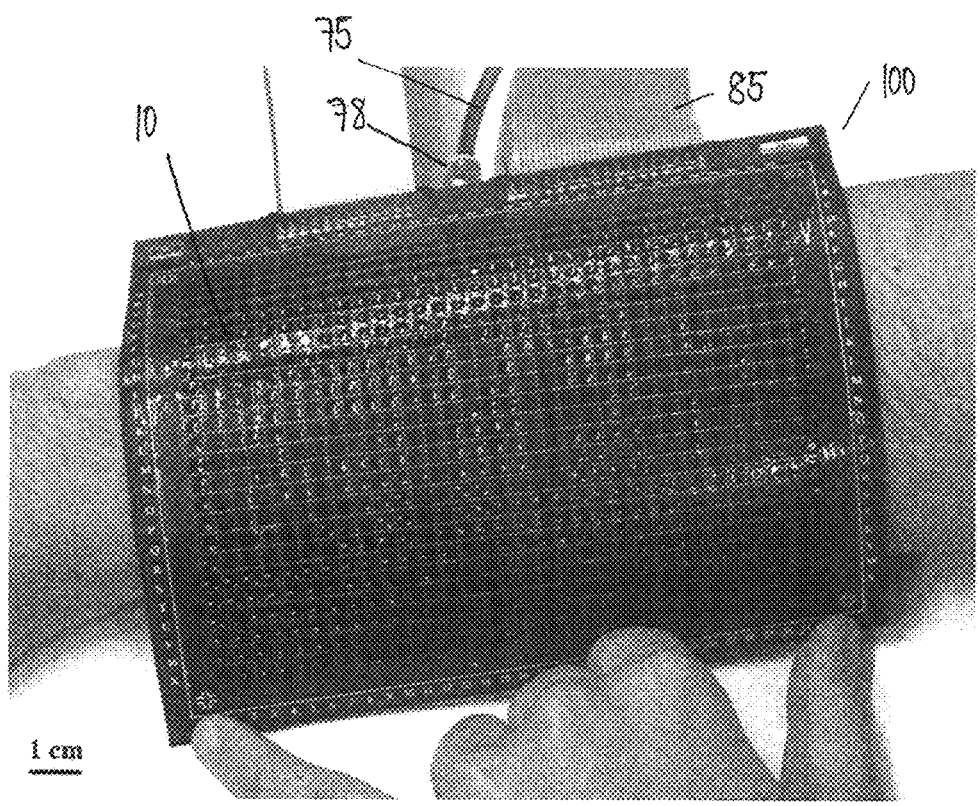
FIG. 3A shows a perspective view of an exemplary embodiment of the flexible haptic display 100, 200.
Figure 3B:
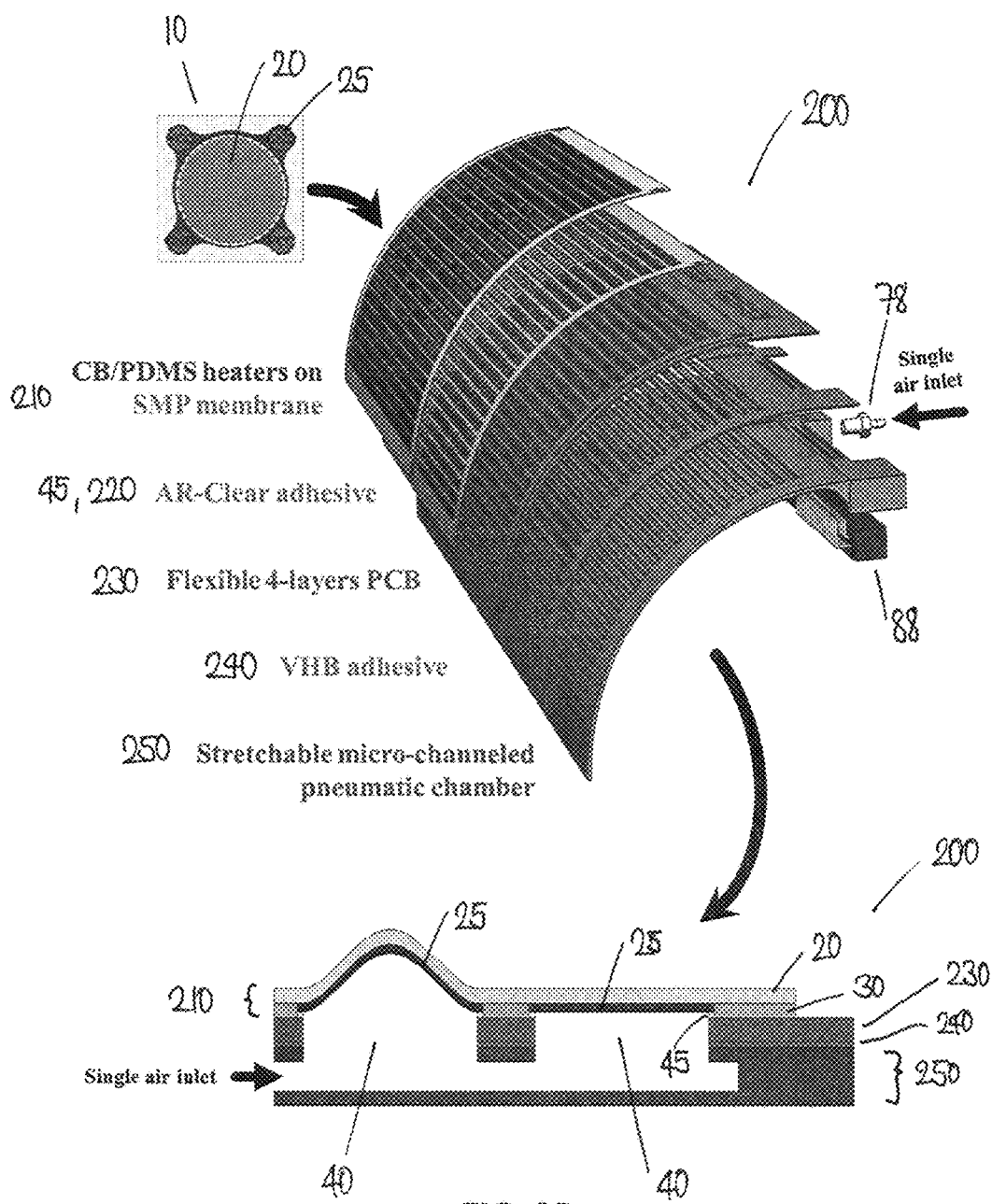
FIG. 3B shows an exemplary exploded view of the flexible haptic display having an array or matrix of 32×24 actuators, for example in an implementation as a flexible active skin having a substantially planar shape in a haptic display sleeve and camouflage scenario using the SMP latching technology as described herein, and FIGS. 3C to 3F showing a perspective view with different configurations of the flexible haptic display.
Figure 3C:
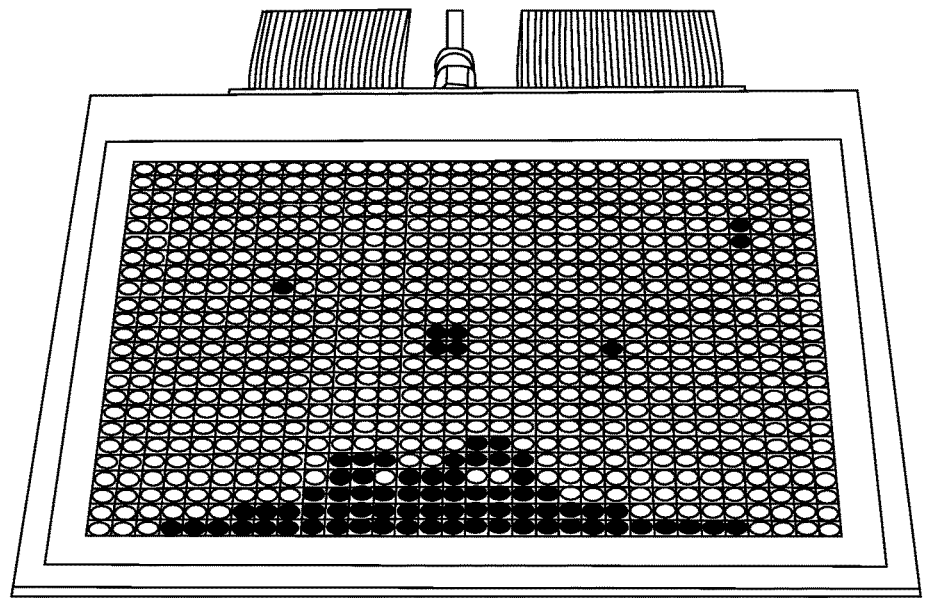
Figure 3D:
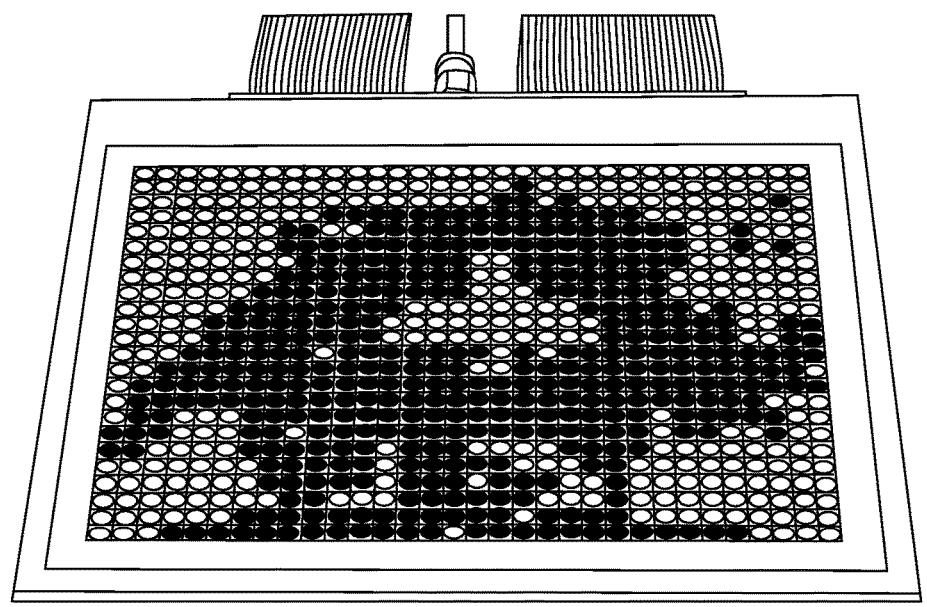
Figure 3E:
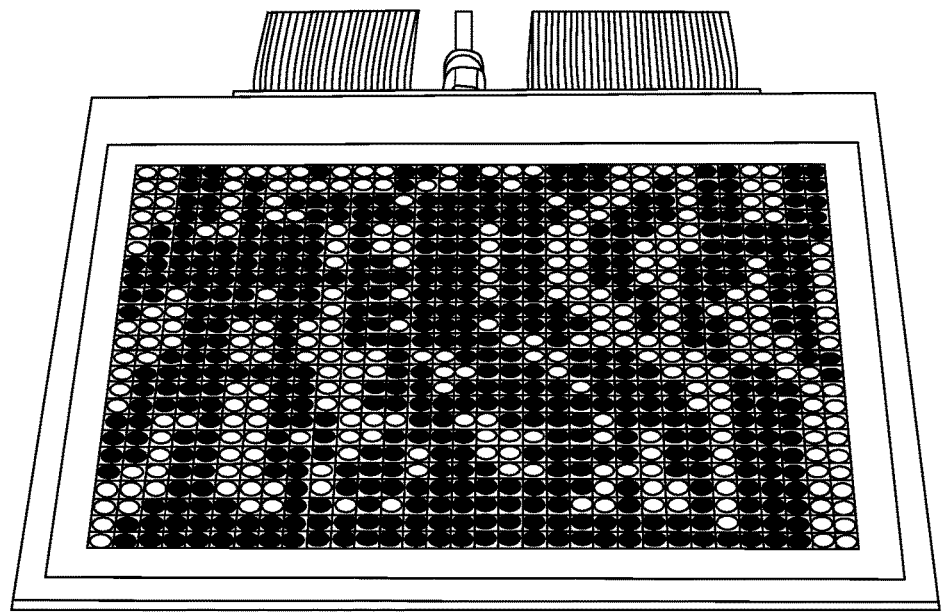
Figure 3F:
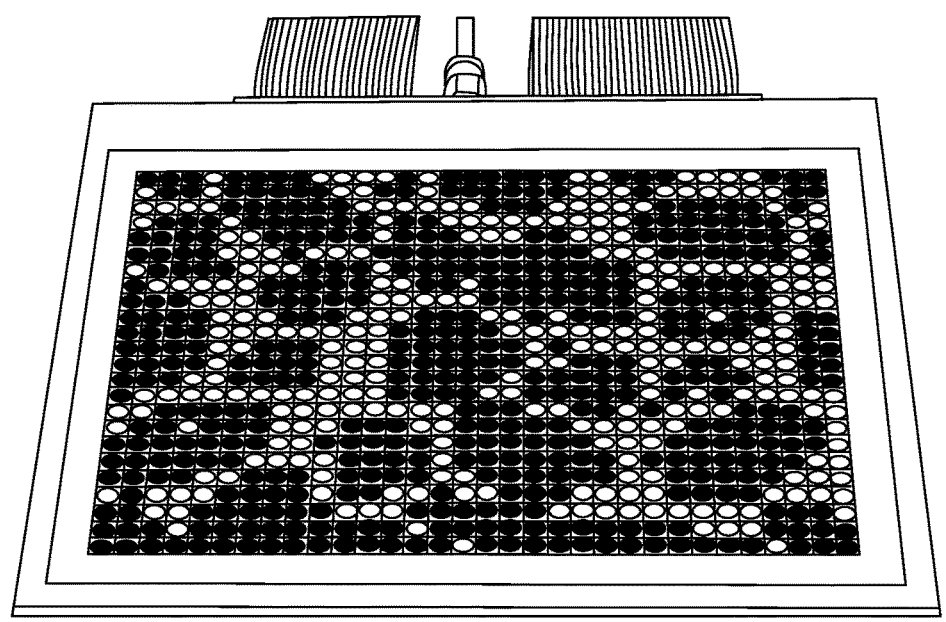
Figure 4A:
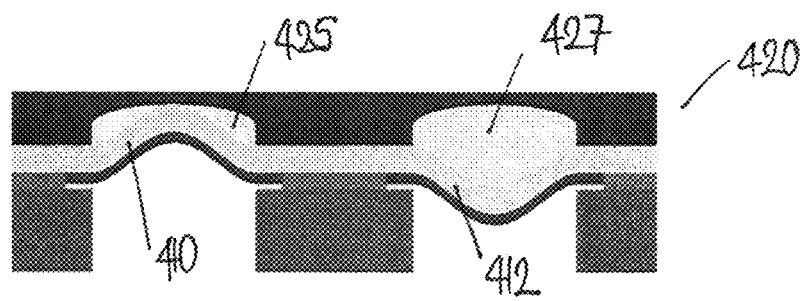
FIGS. 4A to 4D shows a schematic side view of different stages of a two adjacently arranged actuators using SMP-based microfluidic valves. As schematically illustrated, only the heated micro-actuators are moved when pressure is applied.
Figure 4B:
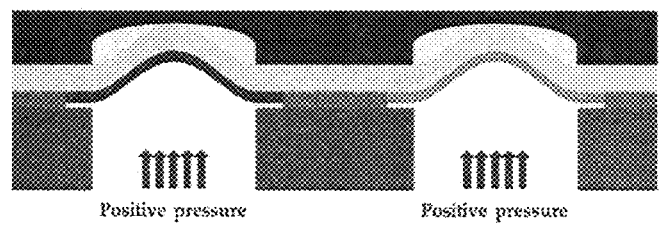
Figure 4C:
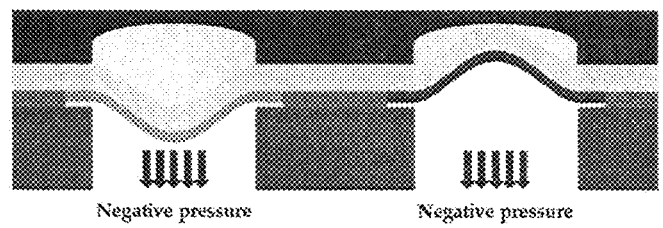
Figure 4D:
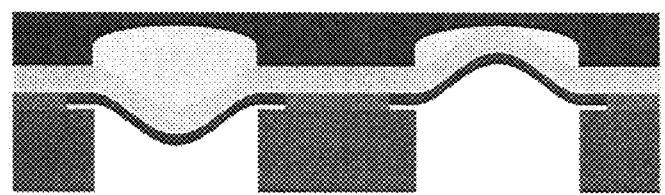

FIG. 3A shows a top perspective view of a flexible SMP array 100 that is attached as a haptic device to an arm of a user, and FIG. 3B shows an exploded view of the different layers for the haptic device 200. In this exemplary embodiment, the array 100 or haptic device 200 are made to be in a planar shape and having a flexible structure, the layers including a first external layer 210 having the heaters 25, the heaters 25 made of a mixture of carbon black and polydimethylsiloxane (CB/PDMS) and the SMP membranes 20 having a round shape, each heater 25 including two VCC and GND terminals for the heating power supply, a second AR-Clear adhesive layer 220 for attachment, a third flexible PCB layer 230 made of four (4) layers that can include the wiring for providing the electricity to the heaters 25, and having a matrix of openings that form the individual pressure interfaces 45, a fourth adhesive layer 240 made of a sealing adhesive, for example but not limited to a Very High Bond (VHB) adhesive, and a fifth stretchable micro-channeled pneumatic chamber 250, the VHB adhesive arranged to provide for a sealed interface and strong adhesion between fourth adhesive layer 240 and pneumatic chamber 250. Moreover, a single air inlet 78 is shown, and a connector port 88 for providing electrical energy to the individual heaters 25. FIGS. 3C to 3F show the display of different exemplary haptic patterns with the flexible SMP array 100.

Microfluidics systems are usually bulky and complex since they require at least 2 N independent valves for an N×N array, each valve being controlled with a dedicated pump. With the present device and method, it is possible to avoid most the pressure sources and select which valve or actuator has to be moved by simultaneously heating it up and applying pressure to all other actuators. As shown in FIGS. 4A to 4D, a microfluidic device 420 with two microfluidic channels 425, 427 are shown in a cross-sectional view, and a shape memory polymer membrane 410, 412 is acting on the corresponding microfluidic channel 425, 427 as a valve element to form a valve chamber, so that a fluidic resistance of the microfluidic channel can be increased or decreased. For example, in FIG. 4D, both actuators are in the upper position, thereby increasing a fluidic resistance to both fluidic channels. This device could be similar to the haptic display described above, with a microfluidic chip placed on top of the active layer. Pressure in each microfluidic channel would then be controlled by actuating the array and moving each transducer independently. The proposed device and method has several advantages, including low power consumption, compactness, portability, and simplicity.

Another application for the present device and method is the use of an array of SMP micro-actuators for reconfigurable antennas and mirrors. Similarly, the SMP micro-actuators can be used as latching pistons and hence, by bonding a reflecting surface on top of the array, antennas or mirrors can be reshaped. Applications such as adaptive optics and satellite communications can benefit from this low-power beam-steering.

Figure 5:
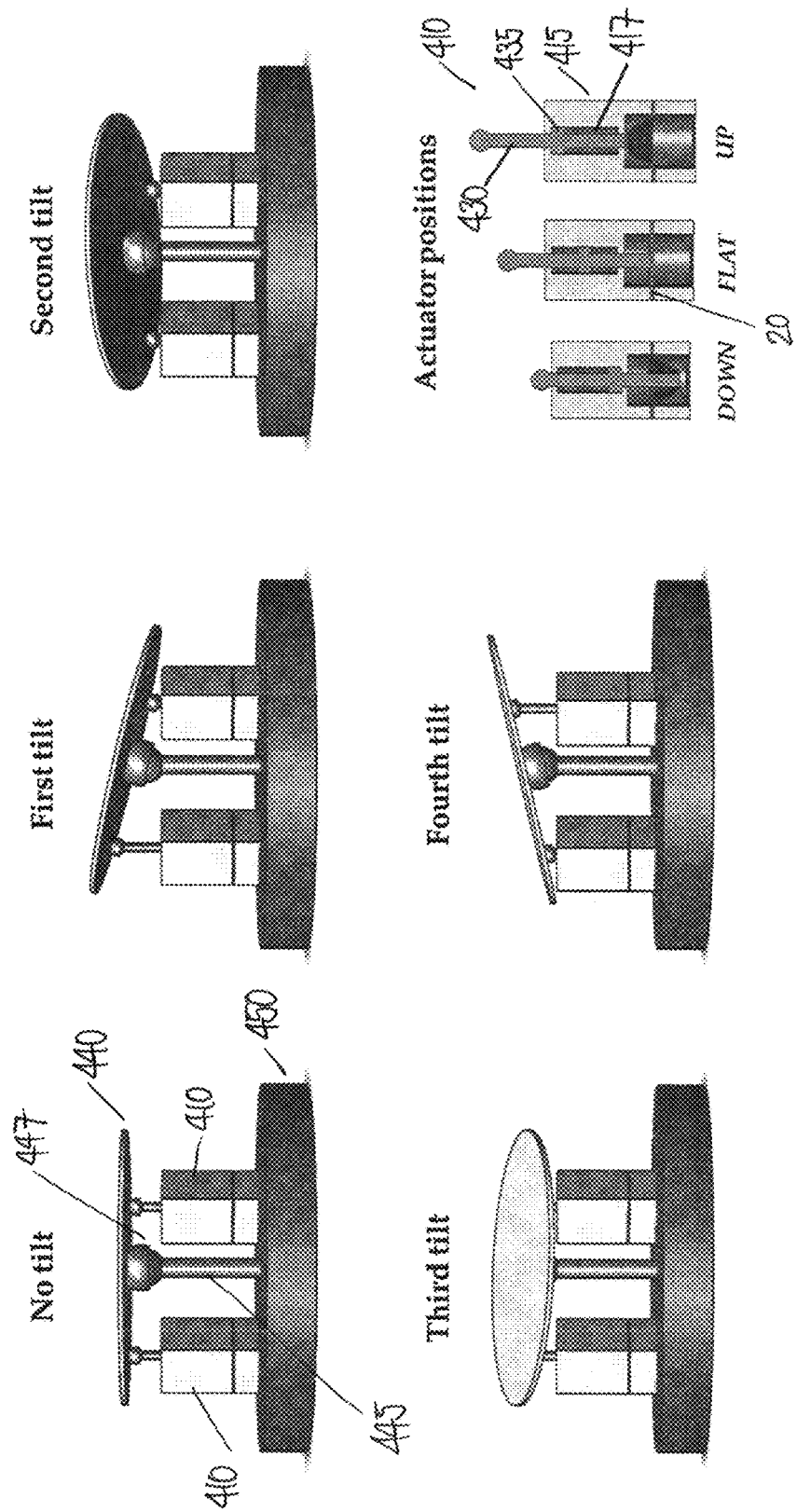
FIG. 5 shows perspective side views of a device using SMP-based latching pistons with rigid reflectors for adaptive optics and satellite communications, and the device can be used for beam-scanning.

For example, FIG. 5 shows side perspective views of rigid reflector or mirror 440 that is actuated by two SMP actuators 410 fixed to a base 450 that can each take three different positions, a down position, a flat position, and an up position, and a support column 445 of fixed height, having a pivotable connection 447 to the rigid reflector 440. This allows to position the rigid reflector at various positions, only by using two SMP actuators, for example for changing an image orientation, redirecting a light beam, etc. Five different positions are shown, with no tilt, and first to fourth tilt. This principle can be used to make a controllable rigid reflector of a very small size, that can be used for adaptive optics, satellite communications, and beam scanning application, for example for laser beams. Instead of a rigid reflector, it can be imagined that an image sensor is placed onto the SMP actuators, to allow for different and configurable viewing direction of the image sensor. As shown in FIG. 5 in the left bottom corner, each actuator 410 is made of a housing 415 piston-like element that includes a movable pin 430 that is attached, on the lower side, to the SMP membrane 420, so that it can be moved up and down. The upper side of the pin 430 can be pivotably attached to the mirror 440, forming a pivotable connection. The moveable pin is guided by a through hole 417 in housing 415, having a motion limiting structure with abutment knobs 435 on pin 430, and housing 415 also integrates an opening in the lower side, as a pressure interface to the common pneumatic actuation mechanism. The pin 430 of piston-like element is pushed up or down by an SMP membrane 420 to which it is attached, or on which it is placed. When the SMP membrane 420 is latched to any given height, the pin 430 of piston-like element is thus also latched to this position.

Figure 6:
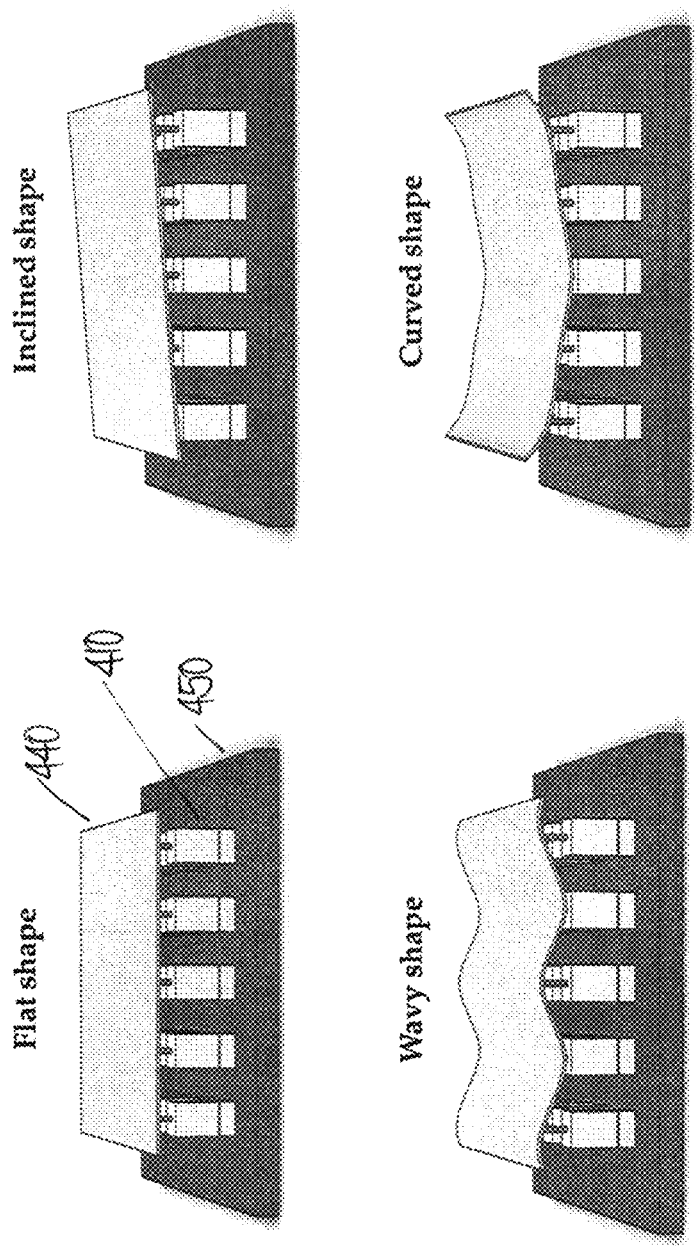
FIG. 6 shows a perspective schematic view of different states of an adaptive reflector based on SMP-based latching pistons array with stretchable reflectors for adaptive optics and satellite communications. It can also be used for complex beam-scanning and image reshaping.

FIG. 6 shows side perspective views of a stretchable and bendable reflector by an array of SMP actuators. In this variant, a stretchable and bendable reflector, for example a PDMS membrane coated with gold, is bonded to upper tips an array of SMP actuators. This arrangement allows for a more complex and complete beam-scanning capabilities and image or beam shaping applications. Four different shapes are shown, with a flat shape when none of the SMP actuators are activated, and showing inclined shape, wavy shape, and curved shape.

According to an aspect, with the applications shown in FIGS. 5 and 6, it is possible to provide for intrinsic multistability of the array of SMP actuators coupled with a simple pneumatic driving scheme. Existing systems can be either replaced or retrofitted to use the SMP actuator concept for fine tuning of the tilting angle.

The device and method allows to selectively control large arrays of latching polymer transducers. In the device, each actuator is composed of a shape memory element, preferably a shape polymer membrane, an integrated compliant stretchable heater, and an interface to a single pneumatic common actuation mechanism. Passing current through the individually addressable local heating elements reversibly and rapidly changes the stiffness of the shape memory polymer of selected actuators. The common pneumatic actuation mechanism allows displacing only the actuators that have been heated, leaving un-displaced the unheated elements. Having a pressure source, shared by all the actuators, allows for large actuation force, yet very simple and compact system design. By turning off the heating current, each actuator can be latched into its current position, enable holding any array configuration with zero power consumption.

According to an aspect of the present invention, the proposed device and method presents a simple control of large array of latching actuators for haptics, adaptive optics, displays, microfluidics, RF beam-steering. It combines the synchronization of an array of local integrated heating elements on a shape memory membrane with a single and common actuation mechanism for the whole system. This allows to present a device that has a surface that can fully reshape by different SMP-based devices, presents low manufacturing complexity of large matrices or arrays of SMP. Also, it is possible to individually address each actuators with standard electronics since it is driven by a heating element, which allows for relatively fast heating and cooling rates by the local integrated heating of the SMP elements, and presents also a multistability and intrinsic latching element that allows to implement a permanent shape and several temporary shapes.

Moreover, the motion is primarily dictated by the heater status, whether the heater is off or on, and not by the pneumatic drive mechanism. Only the heated actuators will be deformed upon actuation, and allows for local modification of the rigidity and multistability. The finally obtained shape of the SMP array depends on the amount of pressure applied. Different possible implementations of the heating elements is possible, by either using a global or local heating. For example, a Joule heating can be used by passing current through the compliant stretchable electrodes that have a certain electric resistance, or a radiation source heater can be used by inducing current in the compliant stretchable electrodes.

Many different applications are possible with the proposed device and method. For example, it is possible to implement tactile tablets and haptic displays, it can be used for tunable RF antennas, RF beam-steering devices, can be used for microfluidic valves, soft robotic, adaptive camouflage surfaces, adaptive optics, for example focusing lenses and mirrors.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

REFERENCES

[1] U.S. Pat. No. 8,237,324
[2] U.S. Pat. No. 8,482,392
[3] U.S. Pat. Pub. No. 2010/0295820
[4] U.S. Pat. Pub. No. 2010/0162109
[5] U.S. Pat. Pub. No. 2010/0234779
[6] Hangxun Xu, Cunjiang Yu, Shuodao Wang, Viktor Malyarchuk, Tao Xie and John A. Rogers, "Deformable, Programmable, and Shape-Memorizing Micro-Optics," Advanced Functional Materials, Vol. 23 (26), pp. 3299-3306, 2013.
[7] Xiaofan Niu, "Dielectric Actuation of Polymers," UCLA Thesis, 2013.

The invention claimed is:
1. An actuator device comprising:
a plurality of transducer actuators; and
a common pneumatic actuation mechanism for shaping the plurality of transducer actuators,
wherein each actuator of the plurality of transducer actuators includes,
a shape memory polymer membrane,
an integrated stretchable heater, and
an pressure interface to the common pneumatic actuation mechanism.

2. The actuator device according to claim 1, further comprising:
a power control device to control electric power supplied to the integrated stretchable heater of each actuator of the plurality of transducer actuators, to selectively activate the transducer actuators individually.

3. The actuator device according to claim 1, wherein the common pneumatic actuation mechanism comprises:
a pump that is configured to generate a positive and a negative pressure; and
a pneumatic chamber having a common inlet that is arranged below the shape memory polymer membrane having a plurality of channels, each channel connected to a corresponding pressure interface of a corresponding actuator,
wherein the pump is operatively connected to the common inlet of the pneumatic chamber.

4. The actuator device according to claim 1, wherein the pressure interface is made from an opening of a flexible printed circuit board.

5. The actuator device according to claim 1, wherein each shape memory polymer membrane is configured such that the common pneumatic actuation mechanism displaces only the actuators that are heated by the corresponding integrated stretchable heater.

6. The actuator device according to claim 1, further comprising:
a microfluidic chip including microfluidic channels,
wherein each microfluidic channel is operatively associated to an actuator of the plurality of actuators, and
wherein each shape memory polymer membrane acts as a valve element on the corresponding microfluidic channel to increase or decrease a fluidic resistance of the microfluidic channel.

7. The actuator device according to claim 1, further comprising:
a mirror,
wherein each actuator of the plurality of actuators further includes a movable pin that is operatively attached to the shape memory polymer membrane, and
wherein a top section of each movable pin is operatively attached to a non-reflective surface of the mirror.

8. The actuator device according to claim 1, wherein the plurality of transducer actuators are arranged in an array.

9. A method for operating an actuator device, the actuator device including a plurality of transducer actuators, and a common pneumatic actuation mechanism, each transducer actuator including a shape memory polymer membrane, an integrated stretchable heater, and a pressure interface to the common pneumatic actuation mechanism, the method comprising the steps of:
selectively heating some of the transducer actuators by the corresponding integrated stretchable heater; and
providing a common fluid pressure to all of the transducer actuators for moving the transducer actuators that are heated by the step of selectively heating.

10. The method according to claim 8, wherein the step of providing generates a negative fluid pressure to pull the shape memory polymer membrane downwards towards the pressure interface.

11. The method according to claim 8, wherein the step of providing generates a positive fluid pressure to push the shape memory polymer membrane upwards away from the pressure interface.

12. The method according to claim 8, further comprising the step of:
maintaining the shape memory polymer membrane in a flat state by a memory function of the shape memory polymer membrane, while no common fluid pressure is provided.

* * * * *